United States Patent Office 2,790,830
Patented Apr. 30, 1957

2,790,830

N-AMINOALKANOL SUBSTITUTED ALKYL-AROMATIC COMPOUNDS

Alfred R. Bader, Milwaukee, Wis., assignor to Pittsburgh Plate Glass Company, Allegheny County, Pa., a corporation of Pennsylvania No Drawing. Application October 21, 1954,
Serial No. 463,831

9 Claims. (Cl. 260—570.9)

This invention relates to novel N-aminoalkanol substituted alkylaromatic compounds, and to a method for the preparation thereof, and pertains particularly to the preparation of N,N-di(aminoethanol) substituted alkylbenzenes by the reaction of halomethyl alkylbenzenes with ethanolamine.

It has heretofore been suggested to prepare alpha-hydroxyphenyl toluenes by reacting benzyl chloride with phenol. However, the reaction takes place only at relatively high temperatures, e. g., about 150° C.

It has further been suggested to prepare haloalkyl derivatives of alkylated benzenes by reacting an alkylbenzene, such as xylene and particularly meta xylene, with an aldehyde, such as formaldehyde, in the present of hydrogen chloride, or other hydrogen halide. It is thus possible to prepare compounds embodying the general molecular structure:

Ar(CH₂—X)ₙ wherein Ar is an aryl radical containing at least one alkyl substituent, X is halogen such as chlorine, and n is a whole number from 1 to 3. Groups or radicals required to satisfy the carbons in the aryl ring and which are not alkyl or halomethyl (—CH₂Cl) groups may be hydrogen, chlorine, bromine or the like.

An outstanding example of such compounds is 4,6-di(chloromethyl)m-xylene, which may also be termed dichlorodurene.

This invention comprises the discovery that halomethyl (chloro, bromo or iodo) substituted compounds of the foregoing type can readily be reacted with alkamines or amino alcohols and notably primary alkamines, such as ethanolamine, propanolamine, butanolamine and the like, to provide salts of compounds containing aminoalkanol groups joined to the aryl nucleus by methylene linkages. The compounds initially are salts, since during the course of the reaction, hydrogen chloride (or other hydrohalide) is formed and may react with the amino groups to produce hydrochlorides. The latter may in turn, be converted to secondary amino groups by reaction with a base, such as aqueous sodium hydroxide.

The reactions are illustrated by that occurring between 4,6-di(chloromethyl)m-xylene and ethanolamine which proceeds substantially in accordance with the equations:

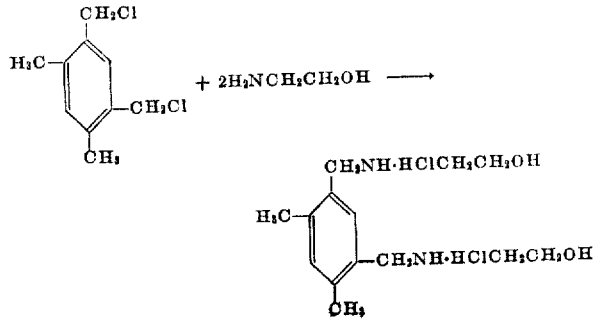

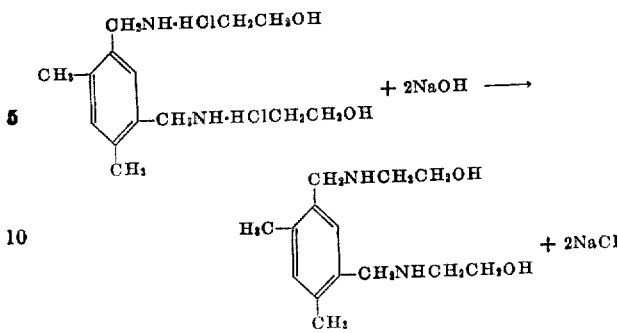

The compound may be termed durylene di(aminoethanol).

The novel compounds obtained by the reaction of halomethyl alkylaromatic compounds with alkanolamines (alkamines) in accordance with this invention all possess the general structure Ar(CH₂—Y)ₙ₁ wherein Ar has the significance given hereinabove, and is preferably a dimethylphenyl radical, Y is a radical derived by removing an amino hydrogen atom from an alkanolamine, preferably ethanolamine, and $n_1$ is a whole number from 1 to 3, and preferably 2. These compounds are glycols which can be reacted with dicarboxylic acids, such as phthalic acid or maleic acid or a mixture of the two, to form long chain polyesters of the well recognized alkyd type. In event that the polyesters include an alpha-beta ethylenic dicarboxylic acid, such as maleic acid, the polyesters may be interpolymerized with a monomer containing a >C=CH₂ group attached to a negative group and being represented by styrene, vinyl acetate, or other >C=CH₂ monomer to provide resinous products.

It will also be recognized that these glycols, such as durylene di(aminoethanol), may be cross-linked by means of dicarboxylic acids, such as succinic acid, phthalic acid, adipic acid and others, to form thermoplastic polyamide-polyester resins useful for melt spinning into filaments or for cordage or for twisting into threads which can be knit, or woven into fabrics in a manner familiar in the polyamide art.

The starting halomethyl alkylaromatic compounds can readily be prepared by a method which broadly comprises reacting an aralkyl compound (preferably meta xylene) with formaldehyde and concentrated hydrochloric acid. The reaction takes place readily at moderate temperatures, for example, 90° C. or thereabouts. In the reaction, a catalyst such as zinc chloride or the like may be employed.

The preparation of 4,6-di(chloromethyl)m-xylene is illustrated by the following example:

*Example I*

A mixture of 848 grams of m-xylene, 1740 grams of 37 percent aqueous formalin solution, 40 grams of zinc chloride and 1200 cc. of concentrated aqueous hydrochloric acid was heated at 90° C. to 95° C. for 18 hours, while hydrogen chloride gas was bubbled through the mixture. The reaction mixture was then cooled and the white solid which crystallized was filtered, washed with water, dried and crystallized once from heptane to yield 869 grams of 4,6-di(chloromethyl)m-xylene, M. P. 93° C.–96° C. The reaction of 4,6-di(chloromethyl)m-xylene with ethanolamine is illustrated by the following example:

Example II

The reactants comprised:

| | |
|---|---|
| 4,6-di(chloromethyl)m-xylene | grams 20 |
| Ethanolamine | do 13 |
| Toluene | milliliters 100 |

This mixture was introduced into a reaction flask without catalysts and was heated on a steam bath with agitation under inert gas for 2 hours. The mixture tended to form layers and the reaction was exothermic. At the conclusion of the foregoing period, another 100 milliliters of toluene was added and the mixture was heated an additional 2 hours and then cooled. The reaction mixture separated into two colorless layers, the lower one of which was viscous, and probably contained the hydrochloric salt of the diamino glycol. The upper layer comprised the toluene.

The mixture was treated with 10 grams of caustic soda in 100 milliliters of water. The oily layer dissolved. A lower aqueous layer and an upper toluene layer remained. The toluene layer was separated and the aqueous layer was washed with toluene and ether and was combined with the separated toluene layer. The toluene solution was washed and stripped by distillation. A waxy white solid remained in a yield of 17 grams. The product was of the formula:

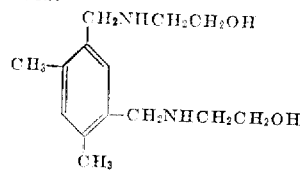

This product reacts in approximately mole for mole ratio with dicarboxylic acids (or their anhydrides), such as phthalic acid or anhydride, or maleic acid or anhydride, when heated to esterification temperature to form alkyds which may be applied as coatings to wood or metal. Mixtures of the alkyd product of the foregoing glycol and maleic acid polyester with styrene may be incorporated with peroxidic catalysts, such as benzoyl peroxide, cumene hydroperoxide, or the like, in an amount of 0.1 to 5 percent by weight based upon the interpolymerizable mixture and cured by baking at temperatures of about 90° C. to 250° C. The interpolymerizable mixture may be catalyzed, poured into molds and cured to provide castings, or the catalyzed mixture may be employed for coating or impregnating fibrous materials, such as fabrics and mats of fibrous materials, such as glass, asbestos, wood, or the like. The resultant laminate may be heated and cured to a hard, durable state.

The durylene-di(aminoethanol) and related compounds are useful for other applications than in the preparation of synthetic resins. For example, it may be reacted with fatty acids, such as stearic acid, oleic acid, elaeostearic acid, linoleic acid, or the like, to form amides and/or esters which can be mixed with water and used as emulsifying agents for lanolin and many other materials. It is to be understood that alkylaromatic compounds other than meta xylene may be employed in the preparation of halomethyl alkylbenzenes. For example, mesitylene, which is 1,3,5-trimethylbenzene, is found to be highly reactive with aldehydes, such as formaldehyde, in the presence of hydrohalides such as hydrochloric acid. The resultant di(chloromethyl)mesitylene reacts with ethanolamine in accordance with the provisions of the present invention to form $\alpha^2,\alpha^4$-pentamethylphenylene-di(aminoethanol) which is a glycol of the following formula:

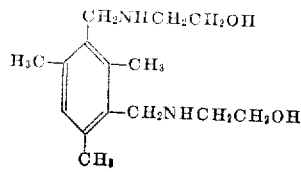

The preparation of di)chloromethyl)mesitylene for reaction with ethanolamine is illustrated by the following example:

Example III

The reaction charge comprised:

| | |
|---|---|
| 1,3,5-trimethylbenzene (mesitylene) | grams 120 |
| Formalin solution (2.33 moles) | do 200 |
| Hydrogen chloride (concentrated) | milliliters 300 |
| Zinc chloride | grams 40 |

The mixture was heated to 90° C. and anhydrous hydrogen chloride was introduced for 6 hours. The reaction mixture was cooled, washed with water, and was further purified by crystallization from heptane. The product was white and crystalline and of a melting point of 101° C.–103° C. The yield was 85 percent on a theoretical basis. The product was of the formula:

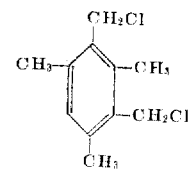

This compound is even more highly reactive than 4,6-di(chloromethyl)m-xylene. The compound can readily be reacted with ethanolamine in accordance with the method of Example II to form a glycol of the structure:

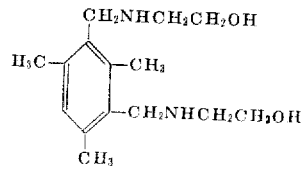

$\alpha^2,\alpha^4$-Pentamethylphenylene-di(aminoethanol)

The $\alpha^2,\alpha^4$-pentamethylphenylene-di(aminoethanol) can be reacted with dicarboxylic acids such as maleic acid, phthalic acid, adipic acid, sebacic acid, or mixture of alpha-beta ethylenic dicarboxylic acids, such as maleic acid, and non-ethylenic dicarboxylic acids, such as phthalic acid or the other acids above listed, to form polyesters in which the glycol functions as a polyhydric alcohol, replacing glycerol and propylene glycol, diethylene glycol, or other polyhydric alcohol in the preparation of the more common polyesters. Polyesters containing an alpha-beta ethylenic dicarboxylic acid component can be interpolymerized with monomers containing $>C=CH_2$ groups attached to negative radicals to form thermoset resin products. The interpolymerizable mixtures can be employed in casting or in laminating. In either instance, the interpolymerizable mixture preferably is incorporated with a free radical initiator, such as benzoyl peroxide, in appropriate amount (e. g., 0.1 percent to 5 percent by weight based upon the interpolymerizable mixture). The interpolymerizable mixtures, if they are to be stored for an appreciable period of time may be mixed with small amounts of gelation inhibitors such as hydroquinone, 3-isopropylcatechol, trimethylbenzyl ammonium chloride, or the like, as disclosed in U. S. Patents 2,593,787 or 2,676,947. Castings and laminates containing free radical initiators, such as 1 percent of benzoyl peroxide, may be cured at temperatures, for example in a range of about 90° C. to 250° C., to a hard, thermoset state.

In the preceding preparation of chloromethyl compounds, as illustrated in Examples I and III, the hydrohalide employed is hydrochloric acid. It is to be understood that the other hydrohalides, such as hydrogen bromide or hydrogen iodide, may be employed in place of hydrogen chloride. The examples also illustrate the use of formaldehyde which is from economic standpoints the most satisfactory member of the aldehyde family for use in the chloroalkylation of the aromatic rings. However, it is to be understood that the same glycols can includes within its scope the use of other aldehydes, such as acetaldehyde, butyraldehyde, and others, to provide halomethyl alkylaromatic compounds useful for reaction with alkamines, such as ethanolamine to form glycols. Also, the monohalomethyl and trihalomethyl compounds can be substituted for the dihalo compounds with good results.

Emphasis has been placed upon the use of the foregoing glycols as polyhydroxy alcohols for reaction with dicarboxylic acids in the preparation of polyesters. However, it is to be understood that the present invention may be used for other purposes. For example, they may be treated with fatty acids as previously described. The glycol of Example II may be mixed with fatty acids, such as stearic acid, maleic acid, linoleic acid, or the like, to form fatty acid amides or esters of fatty acids which can be mixed with water to form emulsifying lipoids and other emollients.

The embodiments of the invention as herein disclosed are to be considered as being illustrative of the spirit of the invention. Those skilled in the art will appreciate that numerous modifications may be made therein without departure from the scope of the invention as set forth in the appended claims.

I claim:

1. The method of preparing a compound of the formula:

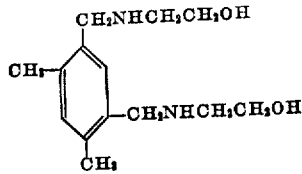

which comprises heating to reaction temperature a mixture of 4,6-di(chloromethyl)m-xylene and ethanolamine at a temperature to form the hydrochloride of said compound and then neutralizing the hydrochloride.

2. The method of preparing a compound of the formula:

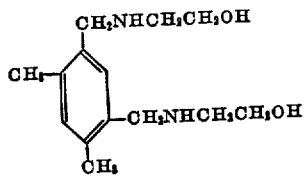

which comprises heating to reaction temperature a mixture of 4,6-di(chloromethyl)m-xylene and ethanolamine at a temperature to form the hydrochloride of said compound and then splitting off hydrogen chloride with an alkaline compound of an alkali metal.

3. The method of preparing a compound of the formula:

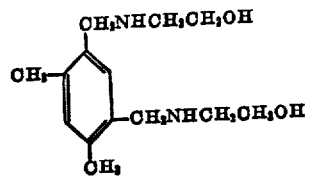

which comprises heating to reaction temperature a mixture of 4,6-di(chloromethyl)m-xylene and ethanolamine at a temperature to form the compound, the hydrochloride of said compound and then neutralizing the compound with sodium hydroxide.

4. A method of preparing $\alpha^2,\alpha^4$-pentamethylenephenylene di(aminoethanol) which comprises heating di(chloromethyl) mesitylene with ethanolamine to form a compound of the formula:

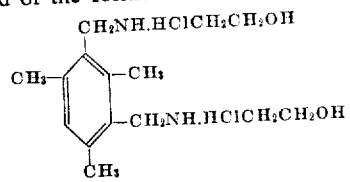

and alkalizing said compound with caustic.

5. A novel chemical compound of the formula:

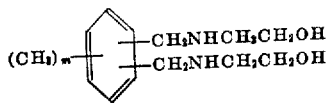

$m$ being a whole number from 2 to 3.

6. A novel chemical compound of the formula:

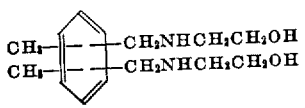

7. A novel chemical compound of the formula:

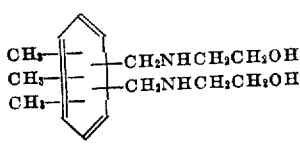

8. A novel chemical compound of the formula:

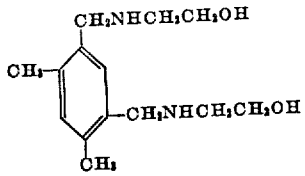

9. $\alpha^2,\alpha^4$-Pentamethylphenylene di(aminoethanol).

References Cited in the file of this patent

UNITED STATES PATENTS

| | | |
|---|---|---|
| 2,229,187 | Peyer | Jan. 21, 1941 |
| 2,519,440 | De Benneville | Aug. 22, 1950 |
| 2,604,399 | Donovan et al. | July 22, 1952 |
| 2,640,080 | De Tar et al. | May 26, 1953 |
| 2,683,744 | Kerwin et al. | July 13, 1954 |

UNITED STATES PATENT OFFICE

CERTIFICATE OF CORRECTION

Patent No. 2,790,830                                      April 30, 1957

Alfred R. Bader

It is hereby certified that error appears in the printed specification of the above numbered patent requiring correction and that the said Letters Patent should read as corrected below.

Column 5, line 1, for "same glycols can" read -- present invention --; line 12, for "present invention" read -- same glycols can --.

Signed and sealed this 17th day of December 1957.

(SEAL)
Attest:

KARL H. AXLINE
Attesting Officer

ROBERT C. WATSON
Commissioner of Patents